US006910928B2

(12) United States Patent
Pease

(10) Patent No.: US 6,910,928 B2
(45) Date of Patent: Jun. 28, 2005

(54) AMPHIBIOUS VEHICLE WITH SPRAY CONTROL MEANS

(75) Inventor: Mathew Roger Pease, Llanelli (GB)

(73) Assignee: Gibbs Technologies Limited (GB)

( * ) Notice: Subject to any disclaimer, the term of this patent is extended or adjusted under 35 U.S.C. 154(b) by 0 days.

(21) Appl. No.: 10/771,017

(22) Filed: Feb. 3, 2004

(65) Prior Publication Data

US 2004/0157507 A1 Aug. 12, 2004

(30) Foreign Application Priority Data

Feb. 3, 2003 (GB) .............................................. 0302428

(51) Int. Cl.[7] .................................................. B60F 3/00
(52) U.S. Cl. ....................................................... 440/12.5
(58) Field of Search ............................ 440/12.5, 12.54, 440/12.51

(56) References Cited

U.S. PATENT DOCUMENTS 2,399,141 A  *  4/1946  Quinn ...................... 440/12.68

4,838,194 A  *  6/1989  Williamson ............... 440/12.53

FOREIGN PATENT DOCUMENTS

| DE | 27 18501 | 4/1977 |
| FR | 2 411095 | 12/1977 |

* cited by examiner

Primary Examiner—Jesus D. Sotelo
(74) Attorney, Agent, or Firm—Luedeka, Neely & Graham, P.C.

(57) ABSTRACT

Amphibious vehicle (10, FIG. 1) has at least one rear wheel arch 14 with recess 20 opening at mouth 22 in arch rear surface 28. The recess contains spray generated by the wheel arch passing over water, channelling spray in a desired direction; preferably underneath the back of the vehicle. At least two such arches and recesses may be fitted on opposing sides of the vehicle. Each recess may be formed in the bottom of the hull; and extend towards the rear of the vehicle. The recess may be tapered rearwardly; and may be substantially semi-circular in a transverse cross-section. A spray rail (25, FIG. 3) may extend around the front of the recess to discourage spray from recirculating into the wheel arch; while the rear edge (26, FIG. 4) of arch 14 may curve smoothly from the recess to the outer bodywork. The vehicle may be a planing vehicle with retractable wheels.

12 Claims, 2 Drawing Sheets

US 6,910,928 B2

AMPHIBIOUS VEHICLE WITH SPRAY CONTROL MEANS

CROSS REFERENCE TO RELATED APPLICATION

Priority is claimed to patent application GB 0302428.8, filed Feb. 3, 2003, entitled AN AMPHIBIOUS VEHICLE WITH SPRAY CONTROL MEANS, invented by Mathew Roger Pease.

FIELD OF THE INVENTION

The present invention relates to an amphibious vehicle with spray control means, and in particular to an amphibious vehicle with spray control means provided in a rear wheel arch or wherever a discontinuity occurs in an otherwise smooth hull or body.

BACKGROUND & SUMMARY OF THE INVENTION

When a watercraft, for example a speed boat, is driven over water, it will generate spray. Such spray can be disadvantageous. Other water users, such as swimmers or fishermen may suffer from the spray and any water skiers towed behind the craft may have their vision impaired. There are also environmental reasons to minimise spray; for example excess spray implies wasted energy.

Amphibious vehicles face difficulties not faced by watercraft in reducing spray. These problems arise from the presence of wheel arches defined in the vehicle hull. In the prior art (e.g. U.S. Pat. No. 4,958,584) amphibious vehicles have been provided with panels which close the wheel arches when the vehicle travels on water. However, it has been found that the opening and closing mechanisms for such panels are prone to mechanical failure due to the ingress of dirt and also due to corrosion. Therefore it has been preferred to have wheel arches which are open on water. However, such wheel arches are substantial discontinuities in an otherwise smooth hull lower surface and therefore generate spray which would not be generated by a smooth boat hull.

The present invention provides an amphibious vehicle having a hull and at least one rear wheel arch provided in the hull at the rear thereof, wherein the at least one rear wheel arch has a recess defined in a rear surface thereof, the rear surface being the surface of the wheel arch nearest to the rear of the vehicle, the recess acting as spray control means when the amphibious vehicle is travelling on water by channelling in a desired direction spray generated by interaction of the wheel arch with the water over which the vehicle is travelling.

Preferably, at least two rear wheel arches are provided in the hull at the rear thereof. Preferably, the rear wheel arches are provided in opposite sides of the hull.

The use of recesses as spray control means reduces the spray displaced outwardly by the vehicle by directing the generated spray in a different direction. Preferably the recesses direct the spray under the rear of the vehicle. Preferably this is achieved by each recess being a recess formed in the bottom surface of the hull extending rearwardly from and opening onto the rear surface of the respective wheel arch.

It is advantageous that the recess provided in the bottom surface of the hull tapers rearwardly from a respective wheel arch. In one embodiment, each recess is substantially semi-circular in a transverse cross-section.

It is preferable that each recess has a mouth region adjacent the rear surface of the respective wheel arch and a spray rail extending around the mouth region. This spray rail prevents spray recirculation forwards into the wheel arch.

The use of substantially linear spray rails on boat hulls is known. In this case, however, the spray rail is formed as a convex rib curved tightly around the mouth of the recess, smoothly blending into the wheel arch as shown in the accompanying drawings.

Preferably, the rear surface of each rear wheel arch has an edge region which extends around each recess to define a lip of the recess, the edge region being at least in part curved to encourage flow of spray into the recess. Each rear wheel arch may extend transversely inwardly from an outer arched edge linking said wheel arch to the vehicle outer bodywork to an inboard surface lying inwardly of a vehicle wheel, and preferably the edge region extending around each recess is curved at least in the part thereof nearest the outer arched edge of the wheel arch. This is the critical area for encouraging flow of spray into the recess. Preferably the outer arched edge of each wheel arch is curved at least in part thereof in a direction extending transversely inwardly towards the inboard surface of the wheel arch.

Preferably the amphibious vehicle is provided with wheel extension and retraction means operable to move a rear wheel located in each rear wheel arch between a lowered position for road use of the vehicle and a raised position for use of the vehicle on water.

BRIEF DESCRIPTION OF THE DRAWINGS

A preferred embodiment of the present invention will now be described by way of example only with reference to the accompanying drawings in which.

DETAILED DESCRIPTION OF THE DRAWINGS

Figure 1:
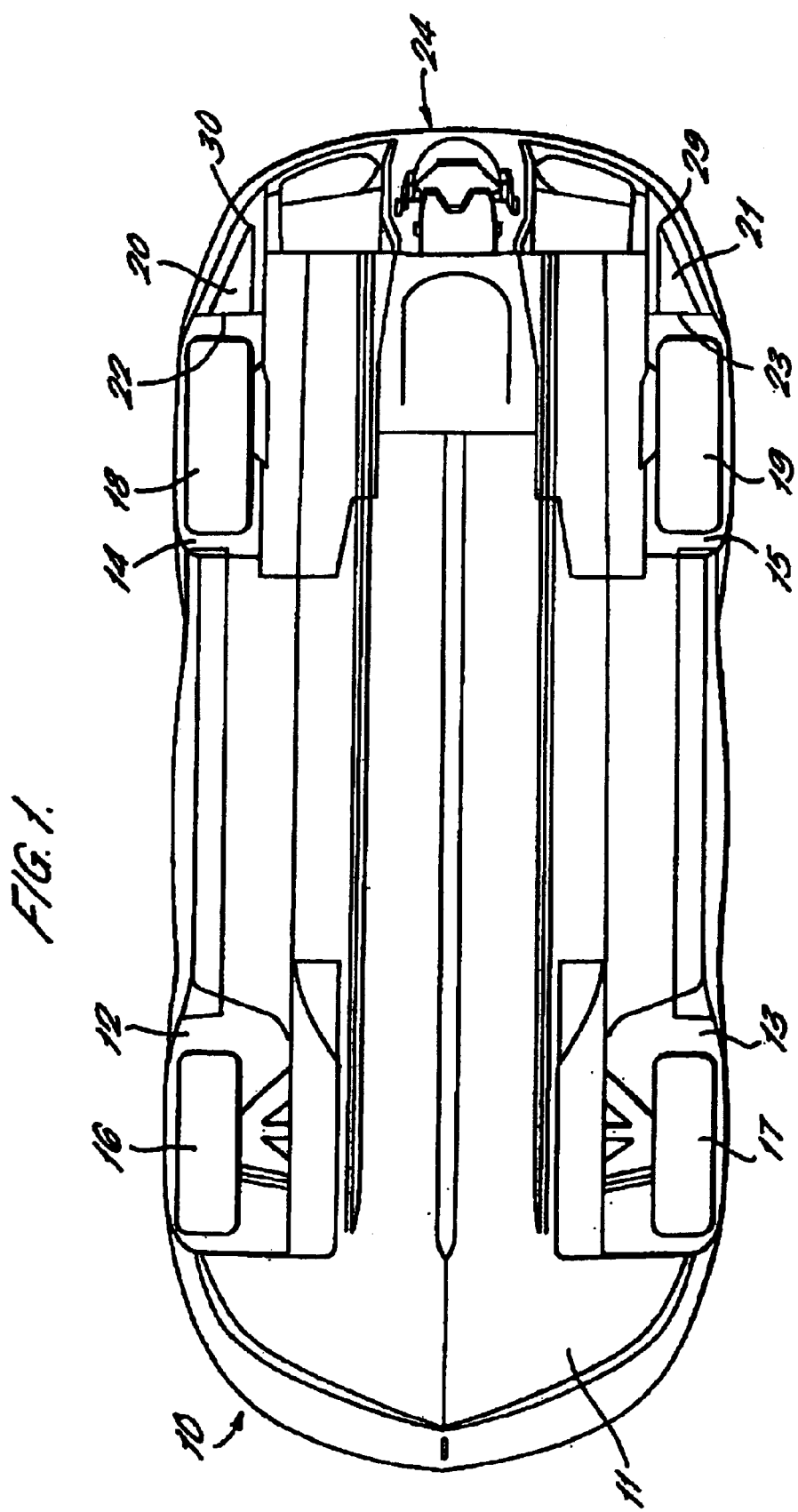
FIG. 1 is an underneath view of a first embodiment of amphibious vehicle according to the present invention.

Turning first to FIG. 1, there can be seen in the figure an amphibious vehicle 10 having a hull 11 which defines a pair of front wheel arches 12 and 13 and a pair of rear wheel arches 14 and 15. In each wheel arch 12, 13, 14, 15 there is provided a road wheel 16, 17, 18 and 19. The road wheels 16, 17, 18, 19 are mounted on movable suspensions which are in turn provided with extension and retraction mechanisms which can move each road wheel between a lowered position, for road use of the vehicle, and an elevated and tilted position, for use of the vehicle on water. The road wheels 16, 17, 18, 19 are moved into the elevated position to reduce drag in water.

The amphibious vehicle shown is designed to plane in water, i.e. the front of the vehicle will lift up out of the water and only the rear of the vehicle will remain in the water. The vehicle has a planing surface defined at the rear of the vehicle, typically extending rearwardly from a point one third of the way along the length of the vehicle from bow to stern.

Disrupting the smooth and continuous planing surface are the two rear wheel arches 14 and 15. These give rise to the generation of a considerable amount of spray. With wheel arches designed in a manner conventional to automobiles, this spray is generally directed transversely outwardly. This is disadvantageous for an amphibious vehicle, for the reasons given above.

The present invention is provided with spray control means associated with each rear wheel arch. The spray control means comprises recesses 20 and 21 provided in the underside of the vehicle hull 11, each of which extends from a mouth 22, 23 opening onto a rear wheel arch 14, 15 and then tapers rearwardly to a point 29, 30. This can be most clearly seen in FIG. 2 where the rear wheel arch 14 is shown (with the rear wheel 18 removed for purposes of illustration) and with the recess 20 shown tapering rearwardly from a mouth 22 opening in the rear surface 28 of the rear wheel arch 14. The rear surface 28 of the wheel arch is the surface which is closest to the rear end 24 of the vehicle.

Figure 2:
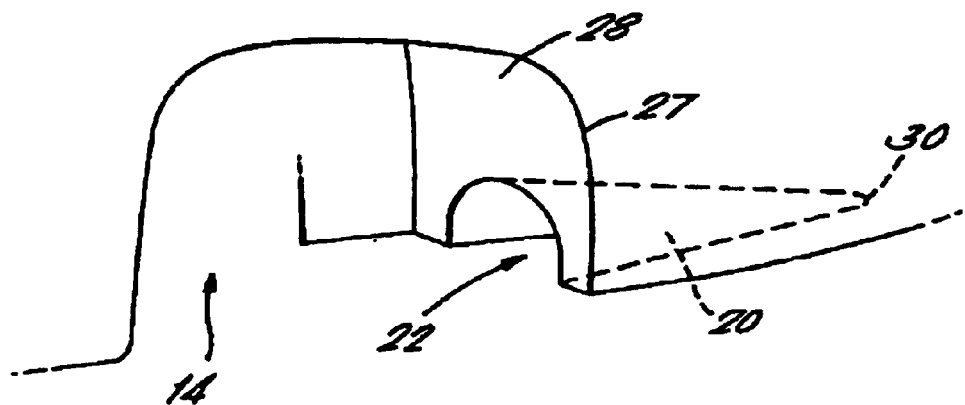
FIG. 2 is a perspective view of a part of the rear wheel arch of the amphibious vehicle of FIG. 1.

Each of the recesses 20 and 21 will be identical in nature (but handed left and right) and for this reason only the recess 20 is shown in detail in FIG. 2. The recess 20 is shaped in a substantially part conical fashion and tapers from the widest cross-section at the mouth 22 rearwardly to a point 30. The recesses 20 and 21 are open to the underneath of the vehicle and when the vehicle is planing on water, the recesses 20 and 21 direct spray generated by the wheel arches 14 and 15 therethrough and down under the back of the vehicle. This reduces the amount of spray which is displaced transversely by the wheel arches 14 and 15.

Figure 3:
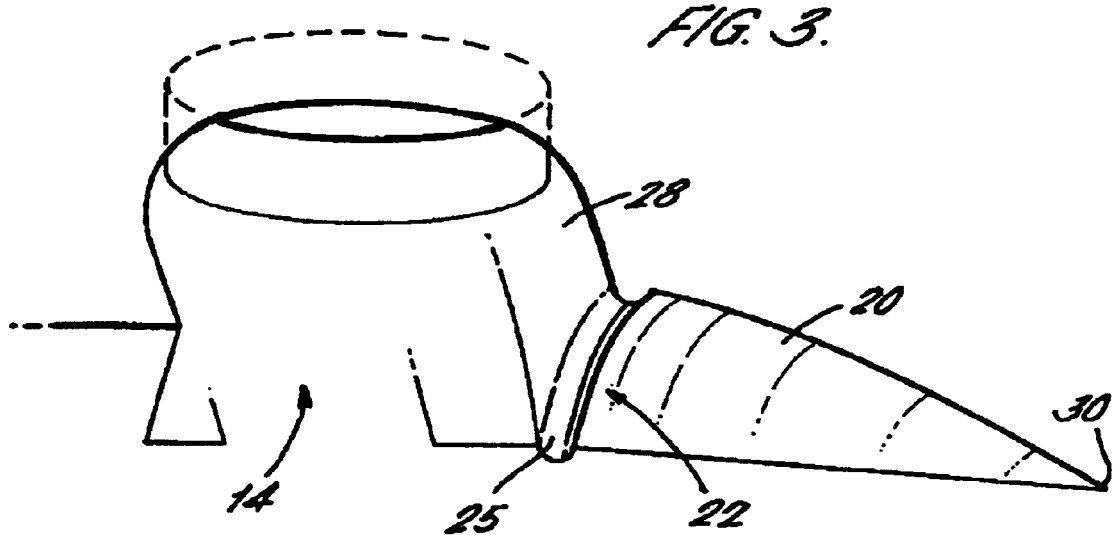
FIG. 3 is a vertical cross-section through a rear wheel arch of a second embodiment of amphibious vehicle according to the present invention.

As mentioned above, each wheel 16, 17, 18, 19 is retractable and this can be seen most clearly in FIG. 3. This figure shows a variation on the design previously described. In this figure the recess 20 is provided in the region of the mouth 22 with a spray rail 25 which extends around the mouth region. The spray rail 25 is designed to affect the flow of spray so that it does not recirculate forward into the wheel arch, thus encouraging the water in the spray to attach itself to the surface of the recess 20 to subsequently drop from the surface back into the water below the vehicle.

Figure 4:
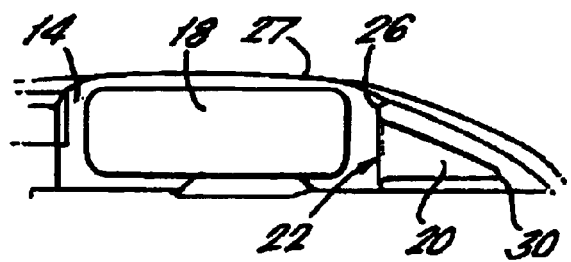
FIG. 4 is an underneath view of a part of a third embodiment of amphibious vehicle according to the present invention.

In FIG. 4 there can be seen a further variation of the design described above in relation to FIGS. 1 and 2. In this design care is taken regarding the shape of the edge region defining the mouth 22 of the recess 20. The edge region is curved to provide a curved lip 26 to the mouth 22 in order to encourage the flow of spray into the recess 20. The lip 26 around the mouth 22 could be curved around the entirety of the mouth, but it is especially important for the lip 26 to be curved in the region of the mouth nearest to the outer arched edge 27 (see FIG. 2) of the wheel arch 14.

By comparison, a typical road vehicle wheel arch would be folded inwards all around the arch with a small radius at its outer edge adjoining a portion which is flat in radial cross-section, parallel to the tyre tread, and spaced radially outwardly therefrom. Such an arch profile, while structurally convenient, allows spray to be deflected back towards the wheel and then into other directions.

The present invention in its various embodiments uses recesses defined in the rear surfaces of the rear wheel arches to control generation of spray by controlling the flow of spray and in particular the direction of flow of spray. Since the traditional wheel arch of an automobile does not have to consider a wheel in the retracted position, the traditional automobile arch does not have the same design requirements as the wheel arch for an amphibious vehicle. Instead, a traditional wheel arch is designed to cope with spray generated by the rolling of the wheel rather than spray generated by the interaction of a wheel arch with water.

It will be appreciated that whilst the present invention has been described as having particular utility in a rear wheel arch of an amphibious vehicle, the present invention may also (or alternatively) be beneficially employed in a front or otherwise located wheel arch. Indeed, the present invention may be used to control spray wherever a discontinuity occurs in an otherwise smooth hull or body.

What is claimed is:

1. An amphibious vehicle having a hull and at least one rear wheel arch provided in the hull at the rear thereof wherein the at least one rear wheel arch has a recess defined in a rear surface thereof, the rear surface being the surface of the wheel arch nearest to the rear of the vehicle, the recess acting as spray control means when the amphibious vehicle is travelling on water by channelling in a desired direction spray generated by interaction of the wheel arch with the water over which the vehicle is travelling.

2. An amphibious vehicle as claimed in claim 1 having at least two rear wheel arches provided in the hull on opposite sides of the hull at the rear thereof.

3. An amphibious vehicle as claimed in claim 1 wherein the recess of the or each rear wheel arch directs the spray underneath the rear of the vehicle.

4. An amphibious vehicle as claimed in claim 1 wherein the recess of the or each rear wheel arch is a recess formed in the bottom surface of the hull extending rearwardly from and opening onto the rear surface of a respective wheel arch.

5. An amphibious vehicle as claimed in claim 4 wherein each recess tapers rearwardly from a respective wheel arch.

6. An amphibious vehicle as claimed in claim 4 wherein the recess is substantially semi-circular in a transverse cross-section.

7. An amphibious vehicle as claimed in claim 1, the recess of the or each rear wheel arch having a mouth region adjacent the rear surface of the respective rear wheel arch and a spray rail extending at least partly around the mouth region.

8. An amphibious vehicle as claimed in claim 1 wherein the rear surface of the or each rear wheel arch has an edge region which extends around the recess to define a lip of the recess, the edge region being at least in part curved to encourage flow of spray into the recess.

9. An amphibious vehicle as claimed in claim 8 wherein the or each rear wheel arch extends transversely inwardly from an outer arched edge linking said wheel arch to the vehicle outer bodywork to an inboard surface lying inwardly of a vehicle wheel and the edge region extending around each recess is curved at least in the part thereof nearest the outer arched edge of the wheel arch.

10. An amphibious vehicle as claimed in claim 9 wherein the outer arched cage or the or each rear wheel arch is curved at least in part thereof in a direction extending transversely inwardly towards the inboard surface of the wheel arch.

11. An amphibious vehicle as claimed in claim 1 wherein the hull has a planing surface at least partly defined by a surface of the hull lying rearward of the or each rear wheel arch.

12. An amphibious vehicle as claimed in claim 1 wherein a rear wheel is provided in the or each rear wheel arch and the vehicle has wheel extension and retraction means operable to move the rear wheel between a lowered position for road use of the vehicle and a raised position for use of the vehicle on water.

* * * * *